Patented May 5, 1942

2,281,942

UNITED STATES PATENT OFFICE 2,281,942

ADDITION AGENT FOR LUBRICATING OILS

Eugene Lieber, Linden, N. J., assignor to Standard Oil Development Company, a corporation of Delaware No Drawing. Application May 20, 1938,
Serial No. 209,146

15 Claims. (Cl. 260—592)

The present invention relates to improved addition agents for lubricating oils and to methods for making the same; likewise to lubricants containing such products. The invention will be fully understood from the following description.

Wax modifying agents have been prepared heretofore by condensation of various waxy aliphatic substances on aromatic compounds, for example, by condensation of chlorinated wax on aromatic hydrocarbons such as naphthalene, or on phenols or amines. In all these instances the aliphatic material has been either halogenated or rendered unsaturated. Otherwise the reaction does not occur and no wax modifying agents would, of course, result.

In the present invention new and improved wax modifying agents are produced from fatty acid esters of phenolic compounds. The process differs radically from the materials made heretofore and occurs by a totally different type of reaction. In the present case the fatty acids, that is to say the acid radical of the said phenolic esters, may be fully saturated and does not have to be either chlorinated or unsaturated because the reaction occurs in a widely different manner than heretofore.

The materials used in making the present modifying agents are, as stated above, phenolic esters of saturated fatty acids, preferably those of more than 10 carbon atoms. The esters may be those of simple phenol or of naphthols or anthrols. In addition to these compounds, the esters of di- and poly-hydroxy phenols may be employed, but it will be understood from the following description of the reaction that it is less desirable to have more than about two hydroxyl groups on a single ring of the phenolic compound, since a greater number interferes with the reaction.

The acid radicals of the esters may be the straight chain saturated acids such as stearic, margaric, palmitic, or the like, or even those of lower molecular weight such as the acids derived from paraffin wax by oxidation with air at from 200° to 300° F., using catalysts such as manganese soaps or other known catalysts.

The mechanisms of the reaction, which occurs, is not completely understood, but it is of the type known as the Fries migration in which the acid radical separates from the hydroxyl group and migrates to another carbon atom of the ring, probably giving rise to a hydroxy ketone as an initial product of reaction. The reaction is brought about with metal halide catalysts of the type of aluminum chloride, zinc chloride, iron chloride and the like, at temperatures above about 250 or 300° F. The temperature should not be above 500° in order to prevent decomposition. The reaction progresses for a period of several hours and ordinarily it is desirable to reflux the compound with the catalyst in the presence of a suitable solvent. Solvents such as the halogenated saturated hydrocarbons of two to three carbon atoms are preferred, for example, trichlorethane, tetra-chlorethane, and the like, although naphthas and kerosenes may be employed. As stated, the nature of the reaction is not completely understood but it is believed that the reaction proceeds further than the simple migration indicated before, so that the desired products have a molecular weight of at least 500 and generally higher. The lower molecular weight compounds which are of the nature of hydroxy ketones have only very weak wax modifying properties. The higher polymerization products which are substantially non-volatile are the desired products.

After a suitable reaction period, which is of two hours or more, the reaction mixture is hydrolyzed by adding water, alcohol or alkali and the wax modifying agent is separated from the sludge by the use of solvents such as kerosene. The kerosene can be distilled off with fire and steam, or by vacuum, to a temperature of about 600° F., and the desired product is recovered as a distillation residue. This material is a light yellow, oily to solid, waxy, freely soluble in lubricating oils, but insoluble in solvents rich in oxygen such as low molecular weight alcohols, ethyl or methyl alcohol, ketones such as acetone or methyl ethyl ketone. The desired fraction may be separated from the reaction mixture by precipitation with such solvents or light hydrocarbons such as liquid propane or butane, instead of distillation.

The wax modifier made in the above manner may be prepared from a fatty acid ester of a monohydric phenol or from dihydric phenols, or polyhydric phenolic compounds, but preferably no more than two hydroxyl groups are to be present in a single ring, since a greater number interferes with the migration. If desired chlorinated wax may be added during the condensation, before or after the migration has been effected, but these are mere variations of the process and are not required.

The wax modifier may be used as such or it may be further improved by esterification of free hydroxyl groups such as may be present. These free hydroxyl groups may be etherified or reacted with aldehydes or other resinifying agents. The materials may also be otherwise modified without markedly affecting the wax modifying properties.

When the wax modifying agent is added in proportion from say .05 to 5% to a waxy lubricating oil, it is observed that the pour point of the mixture is substantially decreased. The amount of the inhibitor used varies in different cases, some inhibitors being naturally more potent than others. Furthermore, certain oils are more susceptible to the action of wax modifying agents than others and the same amount of the modifying agent may produce a considerably different depression of pour point in different oils.

The wax modifying agents may be used also in dewaxing lubricating oils. In this instance they may be added to the oil, and the waxy oil, which is diluted with the wax separating solvent, is then chilled to solidify the wax which may be separated by mechanical means such as filtration, sedimentation, or centrifugation. The effect of the wax modifying agent is to permit more rapid chilling, and more rapid settling and produces a dryer wax which may be more readily separated, for example, at higher filter rate than in the absence of the modifying agent. These materials are found to be effective in almost all of the dewaxing solvents, for example, naphthas or kerosenes, or mixtures of naphtha or aromatic hydrocarbons with low molecular weight alcohols, ketones and the like.

To further understand the nature of the present invention, the following examples are given:

*Example I*

Phenyl stearate is prepared and 18 grams thereof are dissolved in 75 cc. of tetra-chlorethane. To this mixture is then added 8 grams of aluminum chloride and the mixture is placed in a reflux condenser and heated to the boiling point of the tetra-chlorethane which is substantially 300° F. Refluxing is continued for three hours and thereafter the reaction mixture is cooled and the catalyst hydrolyzed by the addition of aqueous alcohol. Kerosene is added and the oily mixture separates from the aqueous and sludge layer. The kerosene layer is decanted and distilled with fire and steam to a temperature of about 600° F., and the wax modifying agent is recovered as a distillation residue. About 16 grams of this product are recovered, which as will be noted is a substantially quantitative yield of the ester employed. The material is a light wax-like solid which dissolves freely in lubricating oils but is insoluble in alcohol, acetone, and similar solvents.

When 1% of this material is added to a waxy lubricating oil which has an original pour point of 30° F., the pour point is reduced to −5° F.

*Example II*

18 grams of mixed phenyl esters of the acids obtained by air oxidation of paraffin wax are admixed with 75 cc. of tetra-chlorethane and 8 grams of aluminum chloride. The mixture is refluxed just as in Example I for a period of three hours and the wax modifying agent recovered from the reaction mixture as before. When 1% of the distillation residue is added to an oil having a 30° pour point, it is found to be depressed to 0° F. When 5% is added to the oil, the pour point is found to be depressed to −25° F.

The present invention is not to be limited to any theory of the mechanism of the reaction nor to any particular reaction ingredients nor methods, but only to the following claims in which it is desired to claim all novelty inherent in the invention.

I claim:

1. An improved method for preparing wax modifiers comprising heating a phenolic ester of a fatty acid having a chain of at least 10 carbon atoms with a Friedel-Crafts catalyst at an elevated temperature of at least about 250° F. for a sufficient period suitable to effect molecular rearrangement of said ester, continuing the heating of the resulting reaction mixture at such an elevated temperature until the molecularly rearranged ester is substantially polymerized into higher molecular weight compounds, and thereafter separating from said higher molecular weight compounds an oil-soluble organic product of high boiling point.

2. A process according to claim 1 in which the polymerization of the molecularly rearranged ester is conducted at a temperature in the neighborhood of 300° F. in the presence of boiling tetra-chlorethane.

3. A process according to claim 1 in which the molecularly rearranged ester is conducted in the presence of an organic solvent boiling and being refluxed.

4. An improved process for producing a wax modifier comprising heating a phenolic ester of a saturated fatty acid having a chain of at least 10 carbon atoms with aluminum chloride as catalyst, to a temperature from about 250 to 500° F., whereby a molecular rearrangement of the Fries migration type is effected in said ester, prolonging the period of heating at the elevated temperature until the molecularly rearranged ester is polymerized into higher molecular weight polymers soluble in hydrocarbon oil, separating said oil-soluble polymers from the other reaction products and distilling said separated polymers to obtain a high boiling point residue of said polymers.

5. A process according to claim 4, in which the ester used in the reaction is a phenolic ester of stearic acid.

6. A process according to claim 4, in which the ester used is phenyl stearate.

7. A process according to claim 4, in which the ester employed is a phenolic ester of an acid produced by a low temperature oxidation of a waxy hydrocarbon.

8. An improved process for producing a wax modifier comprising heating an ester of a dihydroxy phenol and a fatty acid having a chain of at least 10 carbon atoms with a Friedel-Crafts catalyst at a temperature in the range of about 250 to 500° F. to effect a Fries migration type molecular rearrangement of the ester, heating said molecularly rearranged ester at a temperature from about 250 to 500° F. in the presence of a halogenated saturated hydrocarbon solvent boiling at the reaction temperature for a sufficient period to effect polymerization of the molecularly rearranged ester into higher molecular weight compounds soluble in hydrocarbon oil, extracting said higher molecular weight compounds with a hydrocarbon oil, and distilling the extract to recover a high boiling point residue of said higher molecular weight compounds.

9. An improved method for producing a wax modifying compound which comprises the steps of heating a hydroxy ketone formed by a Fries migration molecular rearrangement of a phenolic ester of a long chain fatty acid to a temperature in the range of about 250 to 500° F. with a Friedel-Crafts catalyst in the presence of an organic solvent boiling in said temperature, continuing the heating with refluxing of said solvent until said hydroxy ketone is substantially polymerized into hydrocarbon oil-soluble polymers, and separating said oil-soluble polymers by extraction with a hydrocarbon oil.

10. Improved wax modifying compounds consisting essentially of high boiling point, hydrocarbon-oil soluble, polymers of a molecularly rearranged phenolic ester of a long chain fatty acid, the molecular rearrangement of said ester being of the Fries migration type.

11. An improved wax modifying product consisting essentially of a high boiling residual fraction from hydrocarbon-oil soluble polymers of a phenolic ester rearranged by a Fries migration type of reaction and containing an acyl group having at least 10 carbon atoms.

12. A product according to claim 11, in which said polymers are formed by a rearranged phenolic ester of a saturated fatty acid having at least 10 aliphatic carbon atoms.

13. A product according to claim 11, in which said polymers are formed by a rearranged phenyl stearate.

14. A product according to claim 11, in which said polymers are formed by a rearranged ester of a fatty acid having at least 10 aliphatic carbon atoms and of a hydroxy phenol having no more than 2 substituent oxy groups in a single ring.

15. A product consisting essentially of a ketone polymer having a molecular weight of at least 500 and miscibility with hydrocarbon oil, said ketone containing essentially an acyl group having at least 10 aliphatic carbon atoms combined with a phenyl group having not more than 1 substituent oxy group, and said polymer when admixed with a wax-containing lubricating oil in a proportion of about 1 to 5% having the property of substantially decreasing the pour point of said lubricating oil.

EUGENE LIEBER.